Jan. 29, 1952  R. E. BUCKHOLDT  2,583,764
CONVEYER, PARTICULARLY FOR HEATING FURNACES
Filed Jan. 7, 1950  5 Sheets-Sheet 1

INVENTOR
ROBERT E. BUCKHOLDT
BY
ATTORNEY

Jan. 29, 1952  R. E. BUCKHOLDT  2,583,764
CONVEYER, PARTICULARLY FOR HEATING FURNACES
Filed Jan. 7, 1950  5 Sheets-Sheet 2
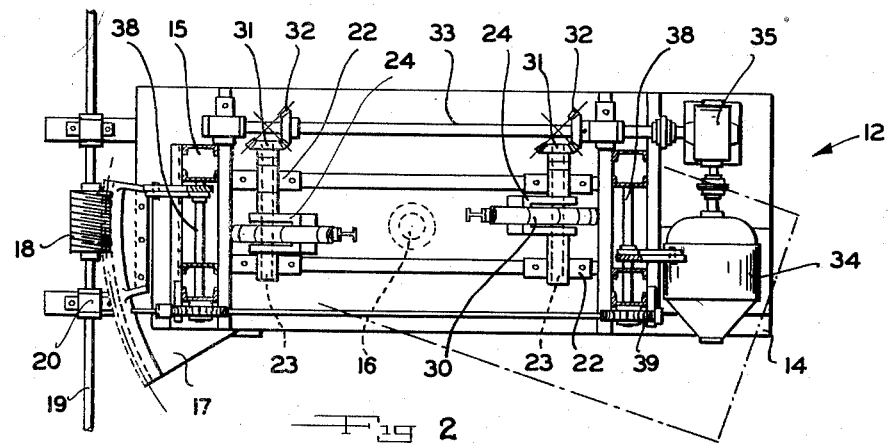
INVENTOR
ROBERT E. BUCKHOLDT
BY Francis J. Klempay
ATTORNEY

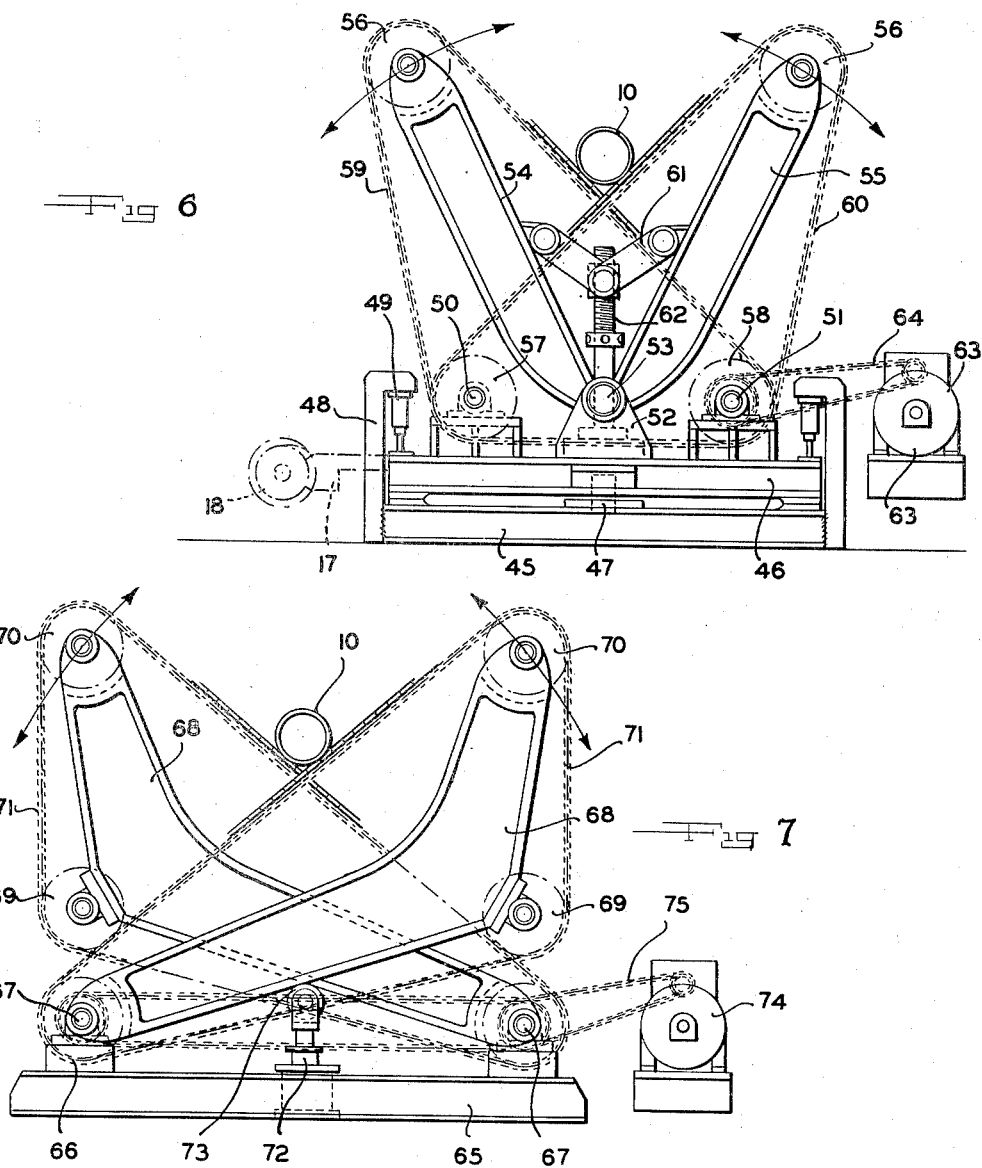

Jan. 29, 1952　　　R. E. BUCKHOLDT　　　2,583,764
CONVEYER, PARTICULARLY FOR HEATING FURNACES
Filed Jan. 7, 1950　　　　　　　　　　　　5 Sheets-Sheet 4

INVENTOR
ROBERT E. BUCKHOLDT
BY Francis J. Klempay
ATTORNEY

Patented Jan. 29, 1952

2,583,764

UNITED STATES PATENT OFFICE 2,583,764

CONVEYER, PARTICULARLY FOR HEATING FURNACES

Robert E. Buckholdt, Salem, Ohio, assignor, by mesne assignments, to Salem Brosius, Inc., Pittsburgh, Pa., a corporation of Pennsylvania Application January 7, 1950, Serial No. 137,350

14 Claims. (Cl. 198—88)

This invention relates to conveyors and more particularly to improved apparatus for moving elongated objects longitudinally while simultaneously rotating the same about the longitudinal axis of movement. Such apparatus is advantageous in transporting heated tubular products and in moving metal shapes such as pipe and bar products through heating furnaces since the desired shape of the products is maintained and in the case of association with heating furnaces the heat is applied evenly about the circumferential extent of the shapes. The apparatus is, however, suitable for more general application as will become obvious as the description thereof proceeds.

In apparatus of the above nature it is often desirable to provide an adjusting arrangement whereby the geometric center of the work pieces being handled may always be maintained at a fixed elevation regardless of variations in the diameter or general transverse dimension of the pieces as in the case of tubes, for example, being fed through small barrel-type of heating furnaces, and heretofore this feature has been provided for by raising and lowering the skewed supporting rolls employed. However, in an arrangement of this nature the larger cross-sectioned work pieces have their centers of gravities raised far above the points of support so that their support is quite unstable. This difficulty is overcome by the present invention through the use of a plurality of spaced conveyor units, each consisting of a supporting chain or chains (in place of the skewed rolls of the prior art) arranged to provide a pair of upwardly inclined crossed-chain reaches in the trough of which the object being handled is laid. The reaches may be rectilinear, of appreciable length, and of such angularity that the elongated object being handled is always stably supported, regardless of its cross-sectional shape and dimensions.

It is accordingly the primary object of this invention to provide an improved arrangement for conveying elongated objects longitudinally while simultaneously imparting rotation thereto wherein means is provided to maintain a fixed elevation for the geometric center of the elongated objects regardless of variations in their diameter or other general transverse dimension without defeating the safety or stability of the supporting arrangement.

Another object of the invention is the provision of improved conveying apparatus for simultaneously moving and rotating elongated objects which may employ supporting and rotating units of minimum longitudinal dimension so that other apparatus arranged consecutively in a production or processing line may be assembled in closely spaced relation for economy of space and for the attainment of other advantages such as, for example, reduction of heat loss from a plurality of assembled barrel-type of furnaces.

A further object of the invention is the provision of improved conveying apparatus of the general character outlined above having substantially improved heat and corrosion resisting characteristics so that the conveying means may be assembled in closer intimate relation with heating furnaces and other industrial apparatus without requiring the addition of water cooling or other protective installations, the use of which may be deleterious in the economy of the general process involved. This general object is accomplished by the use of the chain specified above or equivalent elongated supporting means such as cables since only a small part of the chain or other elongated supporting means is in the highly heated or other affected zone for but a short period of time and is then kept away from this zone for a much greater time in the inherent method of operation of the apparatus of the invention.

The above and other objects and advantages of the invention will become apparent upon consideration of the following detailed specification and the accompanying drawing wherein there are disclosed certain preferred embodiments of the invention.

In the drawing:

Figure 2 is a horizontal section through one of the conveyor units of Figure 1;

Figure 3 is an end elevation of the conveyor unit of Figure 2;

Figures 4 and 5 are side and sectional views, respectively, of the work supporting chain used in the assembly of Figure 3;

Figure 6 is an end view of a modified form of conveyor unit constructed in accordance with the principles of the invention;

Figure 7 is an end elevation of a further modified conveyor unit utilizing the principles of the invention;

Figure 1:
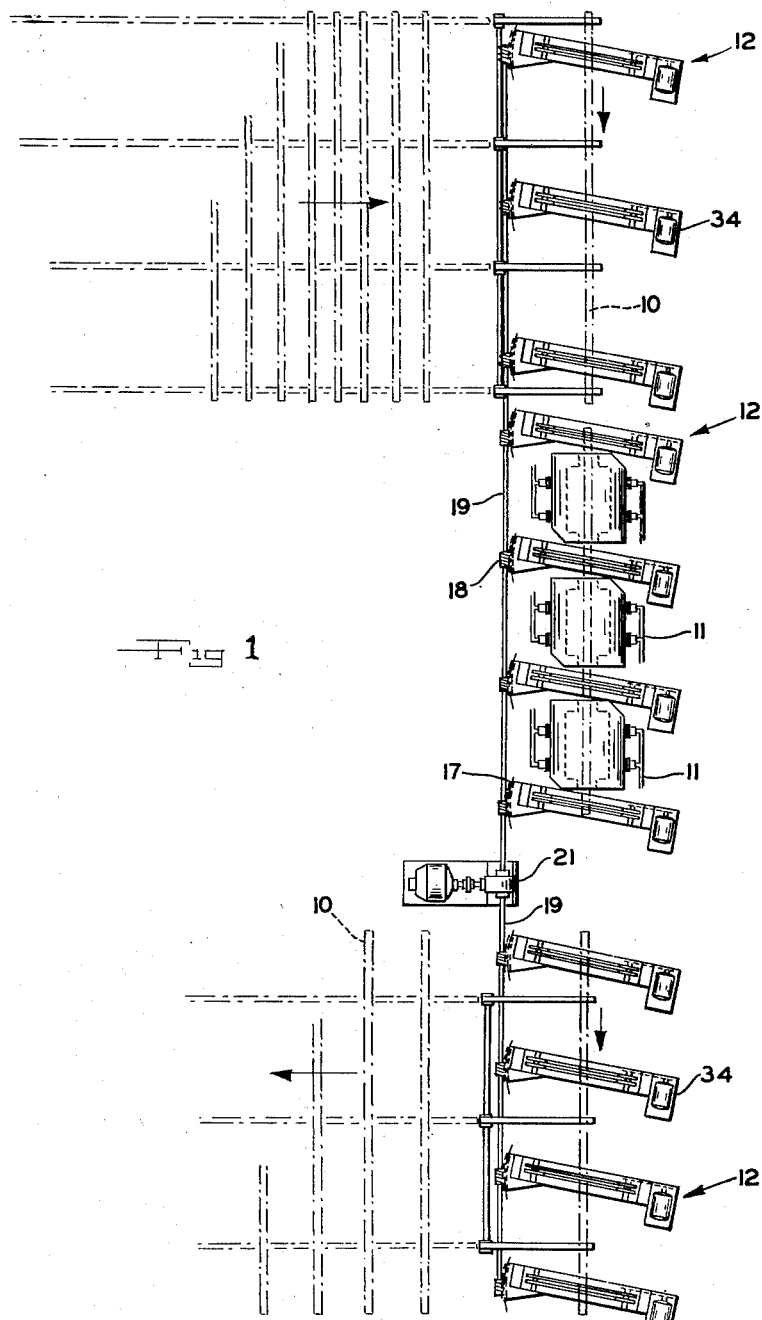
Figure 1 is a plan view of a mill installation utilizing barrel-type of heating furnaces and conveyor apparatus constructed in accordance with the present invention for moving elongated shapes through the furnaces.

Referring to the drawing in detail and first particularly to Figures 1 through 5, the apparatus of the invention is shown as being applied for the purpose of advancing pipe lengths 10 longitudinally through a series of closely spaced but longitudinally aligned barrel-type of heating furnaces 11. As shown, the apparatus of the invention may be embodied in a plurality of longitudinally spaced units which are designated generally by the reference numeral 12 and which are shown more in detail in Figures 2 through 5. Referring now to these latter figures each conveyor unit comprises a fixed base 13 on which is pivotally mounted a rigid frame 14 having at either end a pair of spaced vertically disposed guiding columns 15. The base 14 is mounted for pivotal movement about a centrally disposed vertically extending pivot pin 16. Rigidly secured to the base 14 is a gear segment 17 arranged to be operatively engaged by a worm gear 18 carried by a shaft 19 which is journaled in pillow blocks 20 mounted on the fixed base 13 and by referring to Figure 1 it will be observed that the shaft 19 is common to all the units 12 in the installation so that upon rotation of such common shaft all the units 12 will be skewed in unison. In a practical application, the common shaft 19 may be driven by a motorized gear reducer 21.

Rigidly mounted on fixed parts of the frame 14 are four pillow blocks 22 which journal a pair of spaced parallel shafts 23 which are positioned equidistantly on opposite sides of the pivot pin 16 as shown in Figures 2 and 3. Pivotally mounted by means of a yoke 24 on each of the shafts 23 is an upwardly and outwardly extending beam 25, each of which has a similar yoke 26 at its upper end, in which is journaled a sprocket gear 27. A similar sprocket gear 28 is provided for the lower end of each of the beams 25, being housed within the lower yokes 24 and being keyed to the shafts 23. By means of suitable space blocks, not shown, the yokes 26 are slidably guided between the pair of spaced columns 15 arising from either end of the frame 14.

Figure 10:
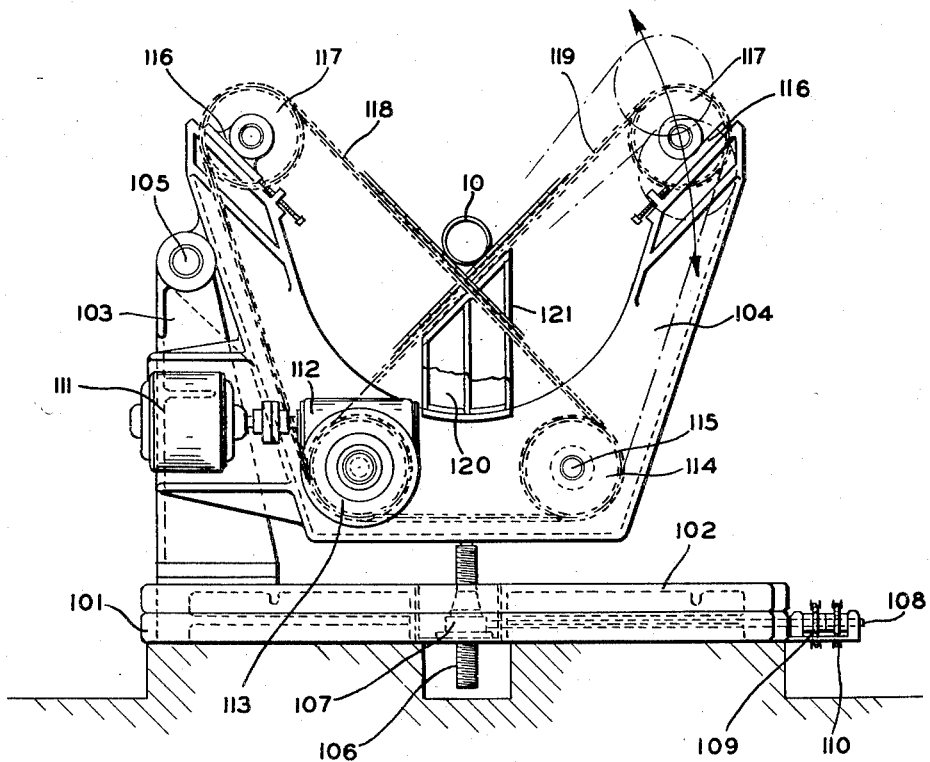
Figure 10 is a still further embodiment of the invention.

By referring to Figures 2 and 3 it will be observed that the two yokes 24 are sufficiently offset with respect to each other so that the two beams 25 will pass each other in a cross or X pattern, thereby providing a supporting groove or trough having sloping side walls of sufficiently low pitch that elongated objects of widely varying cross-sectional dimension and shape may be supported in a stable manner without any tendency to bind. Entrained over the sprockets 27 and 28 of each of the crossed beams 25 is an endless chain 29, alternate links of which carry on their outer surfaces a block 30 of heat and wear resistant alloy and it will be apparent upon inspection of Figure 4 that the assembly of the chain 29 and the blocks 30 is free to bend in one direction to traverse around the circumference of the sprocket wheels but cannot bend in the opposite direction so that there is thus provided a beam-like support for the work as in the case of the pipe 10 which is shown in supported position in Figure 3. I may, however, provide suitable rigid supports, as shown in Figure 10, for those reaches of the chains 29 which have supporting relation to the work and it will be understood that such rigid supports will be mounted on the beams 25 under the said reaches and that the chain of the reaches will simply slide over the supports.

To drive the chains 29 about their orbital paths of movement a bevel gear 31 is keyed to each of the shafts 23 and meshing with the bevel gears 31 are the two bevel gears 32 keyed on a common drive shaft 33. Shaft 33 may be driven by a motor 34 through a speed reducer 35 and it should be noted that the relation of the gears 33 to the gears 31 is such that while the work supporting reach of one of the chains 29 is moving upwardly the work supporting reach of the other of the chains is moving downwardly. This imparts a rotating movement to the work which is highly desirable in many installations. Further, the direction of movement of the chains is so related to the direction of longitudinal advancement of the elongated work pieces that the first chain engaged by the work at each conveyor unit 12 has its supporting reach moving in an upward direction. I have found that this arrangement results in substantially unimpeded longitudinal advancement of the work pieces even when the same is provided with enlargements such as couplings or belled or flared ends. When such enlargements arrive at the upwardly moving chain the chain has a tendency to lift the whole piece a sufficient distance to enable the enlargement to clear the obstruction of the next succeeding or downwardly moving chain.

To provide for the raising and lowering of the work supporting points of the chain assemblies 29, 30 a downwardly and outwardly extending link 36 is pivotally connected to the upper end of each of the beams 25 at the forks 26 and the lower ends of the links 36 are pivotally connected to arms 37 which are keyed onto shafts 38. A worm wheel 39 is keyed to each of the shafts 38 and meshing with the wheels 39 of the worm gears 40 which are keyed onto a common shaft 41 arranged to be rotated by a hand crank 42. Thus when the crank 42 is rotated in one direction the upper ends of both of the beams 25 will be simultaneously lowered while upon rotation of the crank in the opposite direction these ends will be simultaneously raised. This adjusting arrangement enables the geometric center of the work pieces to be maintained at a constant elevation regardless of the diameter or other principal transverse dimension of the work pieces and it should be understood that this feature is advantageous in many applications such as in feeding pipe through the furnaces 11 of Figure 1 wherein it is desired to maintain the concentricity of the pipe in the furnace.

In the embodiment of the invention shown in Figure 6 a fixed base 45 is provided on which is swivably mounted a turntable 46, a pivot pin 47 extending upwardly from the base 45 providing the pivotal interconnection. Extending upwardly from opposite sides of the base 45 and rigidly connected thereto are the arms 48 carrying clamping cylinders 49 whereby the turntable 46 may be tightly clamped in the position to which it is moved by the worm 18 meshing with the gear segment 17. Journaled in spaced parallel relation on the turntable 56 is a pair of shafts 50 and 51 and disposed between these shafts is a pillow block 52 mounting a pivot pin 53. Pivotally mounted on the pin 53 is a pair of divergently related arms 54 and 55 each journalling at its upper free end a chain sprocket 56. A spaced parallel pair of similar sprockets 57 are journaled on the shaft 50 and a pair of spaced parallel sprockets 58 are keyed to the shaft 51. It will be understood, by analogy to the apparatus of Figures 1–5, that the arms 54 and 55 are located in spaced parallel planes and that one each of the sprockets 56, 57 and 58 lie in one of these planes while the other of these sprockets lie in the other planes. Thus, I am able to entrain one closed chain over one of these aligned sets of sprockets while another chain 60 is entrained over the other aligned set of sprockets. This provides crossed inclined chain reaches to provide a trough-like support for the workpiece 10 and it should be obvious that if the parallel planes of the chains 59 and 60 are skewed with respect to the direction of movement of the workpiece and are driven in such direction that one of the supporting reaches of the trough moves downwardly while the other moves upwardly, the workpiece will be rotated about its axis and simultaneously advanced longitudinally.

To raise and lower the points of support for the work piece 10 in the embodiment of Figure 6 I provide a pair of toggle links 61 which are pivotally connected to the arms 54 and 55 at their outer ends and pivotally connected at their inner ends to a nut which is threaded onto a screw 62 held against axial movement. By rotating the screw 62 the toggle links 61 will move inwardly or outwardly to move the axes of the sprockets 56 along the paths shown whereby the work supporting portions of the chains 59 and 60 will be raised and lowered.

To drive the chains 59 and 60 I may provide a motorized speed reducer 63 which is carried by the turntable 46 by means, not shown, and a drive chain 64 interconnecting the output shaft of the power unit 63 and the shafts 51.

In the embodiment of the invention shown in Figure 7 I provide a turntable 65 on which is mounted a pair of spaced pillow blocks 66, each journalling a shaft 67. Pivotally mounted on the shaft 67 is a pair of spaced parallel crossed dog-legged-shaped arms 68, each journalling a chain sprocket 69 at its apex and a second chain sprocket 70 at its uppermost free end. Keyed to the left shaft 67 is a chain sprocket which is aligned in the common plane of the sprockets 69 and 70 carried by the forward arm 68 and a similar sprocket is keyed to the right shaft 67 and aligned in the plane of the sprockets 69 and 70 carried by the rear arm 68. Closed chains 71 are entrained over the sprockets associated with the respective supporting arms and as obvious from Figure 7 these provide crossed inclined reaches for supporting the work piece 10 substantially in the same manner as described above for the embodiment shown in Figure 6. The chains 71 in Figure 7 as well as the chains 59 and 60 in Figure 6 may be of the character shown more in detail in Figures 4 and 5.

To drive the chain 71 in the embodiment of Figure 7 the two shafts 67 are interconnected by a conventional chain drive, as shown, so that one of them may be driven by a power unit 74 through a chain 75. It will be understood that the unit 74 will be carried by the turntable 65. To raise and lower the arm 68 whereby the points of support for the workpiece 10 may be raised and lowered I provide a hydraulic cylinder 72 having a roller 73 at its upper operating end for engaging the lower transverse reaches of both the arms 68.

Figure 8:
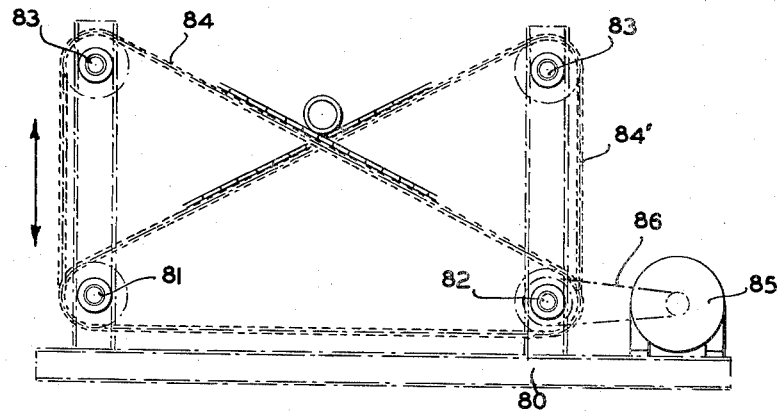
Figures 8 and 9 are schematic views of two further possible embodiments of the invention.

In the embodiment of the invention shown schematically in Figure 8 the turntable 80 mounts a pair of lower spaced shafts 81 and 82 and a pair of spaced upper shafts 83. Keyed on these shafts are sprockets properly aligned to take a pair of closed chains 84 and 84' arranged as shown to provide the required cross inclined reaches for the support of the work. These chains are driven through shaft 82 by means of a power unit 85 and a drive chain 86. In this embodiment the work supporting points of the chains are raised and lowered by raising and lowering the turntable 80 by means of any suitable expedient, not shown, and it will be understood that the construction of the chains 84 and 85 may be similar to that shown in Figures 4 and 5.

Figure 9:
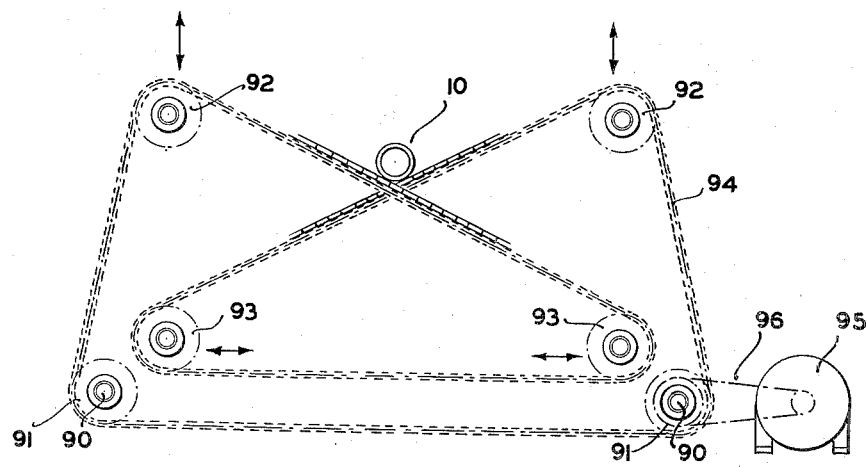

In the embodiment of the invention shown in Figure 9 I provide a spaced parallel lower pair of shafts 90, each mounting a sprocket 91 and I provide four other sprockets 92 and 93 arranged as shown and journaled on a suitable supporting frame to receive a single endless chain 94. This chain is driven by a power unit 95 through a drive chain 96 and it will be understood that by reason of the shown arrangement of entraining the chain over the various sprockets the chain provides a crossed pair of inclined work supporting reaches which move in opposite directions to rotate the work while advancing the same longitudinally, it being understood that the mechanism schematically illustrated in Figure 9 will be mounted in skewed relation to the direction of movement of the work as in the case of the other embodiments shown. Either the supporting frame-work may be moved up and downwardly as a whole or the position of the axes of rotation of the sprockets 92 and 93 may be adjusted as indicated by the arrows in Figure 9 to raise and lower the points of support for the workpiece 10.

In the embodiment of the invention shown in Figure 10 I provide a base plate 101 on which is pivotally mounted for adjustment about a centrally disposed vertical axis a supporting plate 102. In actual practice a worm gear and segment as in the embodiments first described will be employed to turn the plate 102 about the aforementioned axis. Extending upwardly from one side of the plate 102 is a pedestal 103 pivotally mounting at its upper end a U-shaped frame 104. This mounting is accomplished by a pin 105 which is horizontally disposed and the vertical position of the frame 104 is determined by a jack screw 106 which is positioned coincidentally with the axis of rotation of the plate 102 and which is adapted to bear against the underside of frame 104. The screw 106 is provided with a threaded collar 107 arranged to be rotated through worm gearing, not shown, by a horizontally disposed shaft 108 extending through the base plate 101. Keyed on the shaft 108 is a chain sprocket 109 adapted to receive a driving chain and also keyed to this shaft is a second sprocket 110 for receiving a drive chain coupled with another of the units as shown in Figure 10 so that a common drive may be provided for the elevating of each of the units employed in any given installation.

Mounted on the frame 104 is a drive motor 111 operating a speed reducing assembly 112, the output shaft of which mounts a pair of chain sprockets 113 in side by side relation. Transversely aligned with the two sprockets 113 is a second pair of sprockets 114 journaled on shaft 115. At the upper end of each of the legs of the frame 104 is a slidably mounted pillow block 116, each of which journals a chain sprocket 117. It will be understood that the sprockets 117 are located in spaced parallel planes so that one endless chain 118 may be entrained over one each of the sprockets 113, 114 and 117 while another endless chain 119 may be entrained over the other each of these groups of sprockets.

The chains 118 and 119 may be of the type shown in detail in Figures 4 and 5 and the work supporting reach of each chain may be backed up by a guide or support 120 and 121 over which the chains slide. In Figure 10 the upper portion of the guide 120 is broken off in order to show the far slide 121 in full elevation. The crossed chain cradle arrangement in Figure 10 supports and propels the elongated work piece 10 in the same manner as in the embodiments previously described. When larger diametered work pieces are to be handled the jack screw 106 is lowered to tilt the frame 104 downwardly, thereby maintaining the longitudinal axis of the work piece at a fixed elevation.

It should now be apparent that I have provided an improved conveyor which accomplishes the objects initially set out in that the apparatus of the invention provides ready means for conveying elongated objects of widely varying cross-sectional dimension and shape in an entirely stable manner and while yet maintaining fixed the elevation of the longitudinal axis of the objects. Further, as apparent from Figure 1 the short longitudinal dimension of the conveying units of the invention enables associated furnaces or other apparatus to be quite closely spaced and because of the elongated nature of the chains employed the chains may run through a very highly heated zone without danger since any particular portion of the chain has ample time to become cooled before it is brought again into the heated zone.

It should be understood that in each of the embodiments illustrated the supporting chain or chains may be replaced with equivalent cable means without departing from the spirit of the invention and it is accordingly desired that the term "chain" as used herein be construed broadly enough to cover cables or other equivalent apparatus.

The above specifically described embodiments of the invention should be considered as illustrative only as obviously many changes may be made therein without departing from the spirit or scope of the invention. Reference should therefore be had to the appended claims in determining the scope of the invention.

I claim:

1. In apparatus for supporting and simultaneously advancing an elongated object along its longitudinal axis while rotating the object about said axis, the combination of a plurality of spaced conveyor units each having a pair of chain reaches disposed in side-by-side relation and extending in oppositely inclined directions to provide a V-shaped supporting trough, said units being spaced along the longitudinal axis of travel of said object and said chain reaches being mounted for travel in parallel planes skewed with respect to said axis, and means associated with each unit to drive one of the chain reaches of the unit in downward direction while driving the other chain reach of the unit in upward direction to impart rotation and simultaneous longitudinal movement to said object.

2. Apparatus according to claim 1 further including means on each of said conveyor units to increase the pitch of the crossed chain reaches whereby the elevation of support of said elongated object may be varied.

3. Apparatus according to claim 1 further characterized in that each of said conveyor units are mounted on a turntable whereby the degree of skew of said chain reaches with respect to the longitudinal axis of travel of said object may be varied, and driving means interconnecting all of said turntables for rotatably adjusting the same in unison.

4. In apparatus for supporting and moving an elongated object along its longitudinal axis while simultaneously rotating the object about said axis the combination of a plurality of turntables spaced in the general direction of said axis and each mounting a pair of spaced parallel shafts positioned below and on opposite sides of said axis, an upwardly inclined beam pivotally mounted on each of said shafts and journalling at its upper end a chain sprocket, said beams lying in spaced parallel planes and being crossed in relation to each other, a chain sprocket keyed on each of said shafts and respectively aligned with the sprockets journaled on the beams pivoted on the respective shafts, a closed chain for each of said beams entrained over the aligned sprockets on said shafts and beams, the arrangement being such that the upper reaches of said chains form a supporting trough, and means to drive said shafts whereby one of said upper chain reaches moves in upward direction while the other of said chain reaches moves in downward direction.

5. Apparatus according to claim 4 further including means to adjustably rotate said beams on said shafts whereby the angle of inclination of said upper chain reaches may be varied, thereby raising and lowering the object supporting points in said trough, and means to retain said beam in adjusted position.

6. Apparatus according to claim 5 further including a plurality of guiding columns extending upwardly from said turntable to slidably engage the upper ends of said beams whereby the same are restrained against movement in directions parallel with said longitudinal axis, and further characterized in that said means to rotate said beams comprises a second shaft for each of said beams and journaled in said columns, an arm keyed on each of said second shafts, a link interconnecting the outer free ends of said arms with the outer free ends of the respective beams, and means to rotate said second shafts in unison.

7. In apparatus for conveying elongated objects longitudinally and for simultaneously imparting rotation thereto the combination of belt-like means arranged and supported to provide a pair of inclined reaches lying in spaced parallel planes skewed with respect to the direction of movement of the objects, said belt-like means being crossed with respect to each other to define a supporting trough for said objects, and means to drive said belt-like means so that one of said reaches moves downwardly while the other of said reaches moves upwardly.

8. Apparatus according to claim 7 further characterized in that said belt-like means comprises a plurality of chain links pivotally interconnected to traverse about the peripheries of chain sprockets, a plurality of wear blocks carried by the chain in spaced parallel relation to the plane of the interconnection axes of the links when the chain is in straight condition, said blocks abutting each other when the chain is in straight condition to provide a beam-like structure resisting deflection in one direction but capable of being readily bent in the other direction to traverse about the peripheries of said sprockets.

9. Apparatus according to claim 7 further including elongated supporting means under each of said inclined reaches adjacent the point of crossed intersection to resist downward movement of said reaches.

10. In apparatus for conveying elongated objects longitudinally while simultaneously imparting rotation thereto the combination of a pair of spaced parallel shafts, a pair of L-shaped members pivotally mounted on said shafts in offset relation to each other and reversed with respect to each other so that the lower legs thereof overlie each other and the upper legs thereof extend upwardly on opposite sides of the path of travel of the objects, a chain sprocket journaled on the upper end and a second chain sprocket journaled at the bend of each member, a chain sprocket keyed on each shaft in alignment with the sprockets journaled on the respective members, a closed chain for each of said members entrained over the sprockets journaled on the respective members and over the sprocket keyed to the mounting shaft therefor, the inclined reaches of the two chains lying in spaced parallel planes skewed with respect to the axis of said path of travel and being crossed with respect to each other to define a supporting trough for said objects, and means to drive said chains whereby the said inclined reach of one chain moves in a downward direction while the said inclined reach of the other chain moves in an upward direction.

11. In apparatus of the character described a normally fixed base, a support mounted on said base for pivotal movement about a vertical axis, a pedestal on said support offset with respect to said axis, a U-shaped frame pivotally mounted at one end on said pedestal for movement about a horizontal axis, rotatable means journaled on said frame for supporting and guiding belt-like means having a pair of oppositely inclined reaches crossed at a point substantially aligned with said vertical axis, and means to drive said belt-like means whereby one of said reaches moves in an upward direction while the other of said reaches moves in a downward direction.

12. Apparatus according to claim 11 further including adjustable means to tilt said frame upwardly and downwardly about said horizontal axis and to retain said frome in adjusted position.

13. Apparatus according to claim 11 further characterized in that said driving means comprises a motor and speed reducer mounted directly on said frame.

14. Apparatus according to claim 11 further including a nut journaled on said base for rotation about said vertical axis, a screw received in said nut and projecting upwardly into engagement with the bottom surface of said frame, and means extending horizontally through said base to rotate said nut whereby said frame may be adjusted upwardly or downwardly.

ROBERT E. BUCKHOLDT.

REFERENCES CITED

The following references are of record in the file of this patent:

UNITED STATES PATENTS

| Number | Name | Date |
|---|---|---|
| 389,743 | Durrin | Sept. 18, 1888 |
| 1,034,915 | Kaiser | Aug. 6, 1912 |
| 1,108,048 | Willette | Aug. 18, 1914 |
| 1,467,236 | Lavaud | Sept. 4, 1923 |
| 1,568,958 | Carter | Jan. 12, 1926 |
| 1,920,901 | Finley | Aug. 1, 1933 |
| 2,198,178 | Postlewaite | Apr. 23, 1940 |
| 2,366,380 | Bigelow | Jan. 2, 1945 |
| 2,514,293 | Rumsey | July 4, 1950 |